3,044,550
METHOD OF TREATING EARTH FORMATIONS WHICH ARE PENETRATED BY A WELL BORE
Louis H. Eilers, Tulsa, Okla., assignor to The Dow Chemical Company, Midland, Mich., a corporation of Delaware
No Drawing. Filed Dec. 26, 1957, Ser. No. 705,137
11 Claims. (Cl. 166—42)

This invention relates to a method of treating earth wells and particularly to the fracturing of earth formations which are penetrated by a well bore.

In ordinary processes for fracturing earth formations which are penetrated by an earth well fluid is pumped into the well bore and into the formation at pressures sufficient to break down or fracture the formation. Following the breakdown of the formation, additional fluid, which may or may not include a formation propping agent held in suspension in the fluid, is pumped into the earth formation to expand and extend the fractures produced when the formation breakdown occurred. The propping agent, if used, may be sand or other suitable granular material which can support the pressures encountered without crushing. The externally applied pressure is then released and the formation may more or less settle back except where held apart by the propping agent. The formation fluid may then flow along the propped apart channels into the well bore.

Fracturing well formations in the above described manner has resulted, in many instances, in much more rapid recovery of the fluids held in the producing formation than has heretofore been practicable. However, high fluid permeability of the well formation being treated has often limited the distance from the well bore that fractures have been made to extend. In effect, so much formation surface is exposed as fractures increase and extend that the limited amount of fracturing fluid available and the limited amount of horsepower available to pump the fluid into the well bore have often restricted the distance the fractures produced by the treatment extend outwardly from the well bore. Further, the high cost of obtaining and pumping vast quantities of fluid into a well at high pressures and flow rates imposes an economic limit on the "size" of the fracturing treatment.

In wells from which fluids have been produced for some time it has been found that a second or third fracturing treatment is often beneficial. However, the permeability of the partially depleted well formation often complicates the well treatment because the fracturing fluid may be more easily pumped into the depleted part of the formation than is the case when the well formations are substantially saturated with fluids. Thus much of the treating fluid enters the depleted part of the formation and cannot be used to extend or create fractures more distant from the well.

It has been theorized that most of the oil, gas, or other fluid produced from an earth well comes from that part of the producing formation which is relatively close to the well. Such a theory has been substantiated, at least in part, by the fact that a new well drilled between two depleted wells only a few hundred feet apart often has a production potential far greater than the current production of the depleted wells.

Accordingly, a principal object of this invention is to provide an improved method of recovering fluids from an earth formation penetrated by a well bore.

Another object of this invention is to provide an improved method of increasing the area adjacent to a well bore from which fluids are recovered.

A further object of this invention is to provide an improved method of fracturing an earth formation which is penetrated by a well bore.

In accordance with this invention an earth formation which is penetrated by a well bore and which is capable of admitting a fluid from the well bore is treated by injecting into fluid receiving passages in said formation an aqueous hydraulic cement slurry to form a cement filter cake against those surfaces of the formation touched by said slurry and then pumping a liquid through the slurry before the slurry hardens across the entire transverse cross-sectional configuration of the passages.

In practice the first step of the method may include the fracturing of the earth formation with any suitable treating agent (including a cement slurry) to produce the fluid receiving passages in the formation. However, in some wells such passages may exist naturally or may have been produced during previous well treatments.

The hydraulic cement slurry which is pumped into the passages in the earth formation will set while a liquid is being pumped through or is present in the passages, it is sometimes advantageous to use a flash setting agent to more rapidly set the cement. The setting agent may be pumped through the passages as a separate step or may be added to the liquid which is pumped through the passages after the cement slurry is injected therein.

After a liquid has been circulated through the passages while the previously injected cement is setting (with or without the addition to the liquid of a flash setting agent), fracturing of the earth formation may be then caused by injecting a pumpable treating agent at fracturing pressures through the passages which have been injected with cement slurry and into that part of the earth formation which lies beyond the cement treated passages.

Experimental well treatments in accordance with this invention have shown that the injected cement slurry forms a filter cake in fractures or naturally formed passages in earth formation, filling the fractures except where channels are formed when liquid is pumped through the passages following the injection (and prior to the complete setting) of the cement slurry. The cement slurry is apparently driven into the fractures and loses water into the adjacent permeable earth formation, the filter cake then setting in the fractures. The liquid which is pumped through the passages before the filter cake hardens across the fracture apparently washes a channel through the hardened or semi-hardened slurry in the fracture. Cores taken through rock formations adjacent to wells which have been treated in accordance with this invention show fractures of the pancake type which are filled with cement except for a channel about ⅛ inch high and ¼ to ⅜ inch in width. The cores referred to above were taken from a well which had been treated in accordance with the invention and then allowed to set for over one week before a settable plastic material was pumped into the passages to preserve them for examination. The cores with the plastic therein set indicate that the previous cement injection and pump through stage well treatment had at least sharply reduced fluid loss into that part of the formation which is near to the well bore, as the settable plastic is confined to the channels through the cement in the formation passages (or fractures). Further, the condition of the channels indicates that the cement slurry had sufficient compressive strength to prevent the closing of the channels in the time (a week or more) between the end of the cement injection part of the well treatment and the later injection into the channels of the settable plastic.

The well treatment as described above, illustrates that the earth formation close to the well bore may be prevented, in accordance with this invention, from absorbing any substantial quantity of the pumpable treating agent used in fracturing the well by providing flow channels through otherwise sealed off passages whereby the treating agent may be easily injected into parts of the formation which are more remote from the well bore.

Thus, in its broadest aspect, this invention is a method of preparing an earth well for further treatment. The "further" treatment, however, may be and usually does comprise an additional step or steps which are carried out in conjunction with and as a part of the invention or may, under specified circumstances, be done at a later time.

Several types of cement may be used in practicing this invention. A cement having high fluid loss characteristics is usually preferable to a low fluid loss type of cement. Portland type cements are probably best for all round usage in connection with this invention because of their reasonable cost and desirable fluid loss characteristics. It is desirable that the cement be capable of setting (flash or otherwise) to a compressive strength of 100 pounds per square inch and preferably 300 pounds per square inch within 30 minutes.

Lime-pozzolan cements, limestone-sodium silicate cement, or calcium aluminate type cement (sold as "Lumnite," for example) may be substituted for portland type cement in practicing this invention. In addition, extenders, retarders or accelerators may be added to the cement as required. Sand, for example, may be used as an extender for cement, rather than as a propping agent, in connection with this invention.

A suitable lime-pozzolan cement formulation for use with this invention is: Kaolinite (heated to 1200–1600° F.), 43.2 lbs.; lime, $Ca(OH)_2$, 15.1 lbs.; and 5 gallons of water. This formulation provides a slurry having a density of 12.9 pounds per gallon with a temperature range (for setting) of 130° to 300° F. Sodium hydroxide, sodium sulfate and sodium carbonate may be used to accelerate this cement. Sodium silicate may be used to flash set this cement.

A typical suitable limestone-sodium silicate cement may be made according to the following formulation: 30 cc. of 38 percent water solution of sodium silicate, 5 grams of sodium hydroxide, 5 cc. of water, and 60 grams of precipitated calcium carbonate. This cement may be flash set with a suspension of calcium hydroxide or barium hydroxide. "Lumnite" or calcium aluminate cement may be accelerated and flash set with potassium fluoride, hydrofluoric acid, sodium silicate or phosphoric acid. "Lumnite" cement has a high compressive strength shortly after setting and is therefore well adapted to use in well treatments where the over-burden pressures are high and the formation can be retained under treating pressure for only a short time.

When formation fracturing follows the injection of cement slurry and the over flush of the cement slurry with liquid (and possibly a flash setting agent), the treating agent may, for example, be water, water plus sand, thickened water plus sand, petroleum oil, semi-refined oil plus sand, crude oil plus sand, thickened crude oil plus sand, refined oil-acid emulsion plus sand, and soap thickened oils plus sand.

In one treatment of a water well made in accordance with this invention, the formation being treated was first broken down or fractured with water at a pressure of 1300 pounds per square inch, following which the pump-in pressure was 700 pounds per square inch at a pumping rate of 7.7 barrels per minute. Following this, a slurry comprising 15,000 pounds of portland cement plus 4 percent calcium chloride (based on the weight of the cement) and mixed with sufficient water to make a slurry weighing 15.6 pounds per gallon was pumped into the broken down formation at a pump-in pressure of 1000 pounds per square inch. The pump through stage of the treatment comprised pumping 8 barrels of water through the cement slurry at a pump-in pressure of 1100 pounds per square inch. The well was shut in under pressure for about 5 hours, following which the well formation being treated was fractured by injecting treating fluid composed of 10,000 gallons of fresh water thickened with 400 pounds of guar gum and having 8,000 pounds of 20–40 mesh sand propping agent at an initial pressure of 1000 pounds per square inch, and at an average pressure of 600 pounds per square inch. The well was then held under pressure for several hours, following which the pressure was released and a production test was made by swabbing. Water production was found to be 40 barrels of water per hour as compared with prior productoin of 20 barrels of water per hour.

In an oil well treated in accordance with this invention, the treated formation was initially broken down, using water, at a pressure of 1800 pounds per square inch. Cement slurry comprising 19,000 pounds of portland cement plus 2 percent calcium chloride (by weight of the cement) in water to make a pumpable slurry was injected into the formation at pressures of 1300 to 2100 pounds per square inch. The cement was followed by a pump through stage of 4 barrels of water and then 12 barrels of 4 percent sodium silicate solution to flash set the cement slurry. The treatment was then immediately continued by fracturing the formation with treating agent composed of 10,000 gallons of water thickened with 200 pounds of guar gum and mixed with 10,000 pounds of 20–40 mesh sand. The treating agent entered the formation at pressures of 1500 to 1650 pounds per square inch. The treating agent was followed by 4,000 gallons of water as an overflush stage. Fluid production of the well was 4 barrels per day compared with negligible fluid recovery prior to the treatment. It should be realized that the above described well treatment was made on a well which was commercially non-productive because of the depleted state of the producing formation.

While this invention has been discussed in connection with improving the production of somewhat depleted wells, it is equally applicable to "new" wells. The cement to be injected into the formation may be of a porous type or of an acid soluble type which may be easily dissolved during a subsequent acidizing treatment. Alternatively, after the fracturing of the formation beyond the cement laden part thereof is accomplished, the pumping rate may be increased to build up surge pressure sufficient to also fracture the cemented part of the formation. Thus, recovery of fluid from a larger volume of the producing formation is assured than if a simple fracturing treatment is made. Further, the treating method of this invention prevents the loss of well fluids into parts of the formation which were already excessively fluid permeable, thus avoiding waste of the treating agent.

In its simplest concept, and as confirmed by cores taken from a formation treated in accordance with the invention, this well treating method prevents the loss of pumpable well treating material into those parts of the treated formation which are close to the well bore by providing small "pipes" or cement lined passageways through the cemented channels in the formation. The treating material may therefore be used to fracture or treat parts of the formation which are remote from the well bore without, as formerly occurred, the high loss of fluid to close-in parts of the treated formation. Thus, when this invention is practiced, the volume of the producing formation which may easily feed fluid to the well bore is substantially increased.

While fracturing of the earth formation following the pump-through stage of the treatment has been described in connection with the invention, acidizing, injecting heated liquids into the formation or stimulation of the treated formation by sonic methods may also be done, for example, following the pump-through stage of the treatment.

I claim:

1. A method of treating an earth formation penetrated by a well bore, comprising injecting a pumpable treating agent into said earth formation to fracture said formation and make fluid receiving passages therein, then injecting into said fluid receiving passages an aqueous hydraulic cement slurry to form a cement filter cake against the wall surfaces of the passages touched by said slurry, and then pumping a stream of treating agent in excess of the amount capable of filtering through said filter cake through said filter cake before said filter cake hardens across the entire cross-sectional configuration of said passages to displace unfiltered slurry further along said passages.

2. A method in accordance with claim 1, wherein flash setting material is pumped through said filter cake following the pumping through of said treating agent.

3. A method in accordance with claim 2, wherein additional pumpable treating agent is pumped into said formation following said flash setting material at a pressure initially at least equal to the breakdown pressure of the formation and then at a suitable pump-in pressure.

4. A method in accordance with claim 3, wherein said additional treating agent is any commercially used formation fracturing treating agent.

5. A method in accordance with claim 2, wherein an acid solution is pumped into said formation following said flash setting material.

6. A method of treating an earth formation penetrated by a well bore, said earth formation being capable of admitting a fluid from the well bore, comprising injecting into fluid receiving passages in said formation at pressures sufficient to fracture said formation an aqueous hydraulic cement slurry to form a cement filter cake against the wall surfaces of passages touched by said slurry and then pumping a stream of treating agent through said filter cake in excess of the amount capable of filtering through said filter cake before the filter cake hardens across the entire cross-sectional configuration of said passages to form at least one essentially open passageway surrounded by said filter cake.

7. A method in accordance with claim 6, wherein an acid solution is pumped through said passageway following said stream of treating agent.

8. A method in accordance with claim 6, wherein said treating agent pumped through said slurry has an aqueous base.

9. A method in accordance with claim 6, wherein, after the stream of treating agent is pumped through said filter cake, a flash setting solution is pumped through said filter cake to contact said filter cake and cause rapid setting thereof.

10. A method in accordance with claim 9, wherein said formation is held under external pressure for at least one-half hour after the stream of liquid is pumped through said filter cake.

11. A method in accordance with claim 6, wherein said formation is held under external pressure for at least one-half hour after the stream of treating agent is pumped through said filter cake.

References Cited in the file of this patent

UNITED STATES PATENTS

| | | |
|---|---|---|
| 2,782,857 | Clark et al. | Feb. 26, 1957 |
| 2,796,131 | Hinchliffe et al. | June 18, 1957 |
| 2,806,530 | Binkley | Sept. 17, 1957 |